United States Patent [19]
Yamamoto et al.

[11] 4,455,573
[45] Jun. 19, 1984

[54] TELEVISION SOUND RECEIVER

[75] Inventors: Yoshihiro Yamamoto, Tokyo; Hiromi Kawakami, Yokohama, both of Japan

[73] Assignee: Sony Corporation, Tokyo, Japan

[21] Appl. No.: 390,770

[22] Filed: Jun. 21, 1982

[30] Foreign Application Priority Data

Jun. 25, 1981 [JP] Japan ................................. 56-98590

[51] Int. Cl.³ ............................................. H04N 5/60
[52] U.S. Cl. .................................... 358/198; 358/197
[58] Field of Search ............. 358/188, 197, 198, 191.1

[56] References Cited
U.S. PATENT DOCUMENTS 4,356,510 10/1982 Nakayama ........................... 358/198

Primary Examiner—Richard Murray
Attorney, Agent, or Firm—Alvin Sinderbrand; Lewis H. Eslinger

[57] ABSTRACT

A television sound receiver includes an input terminal for selectively receiving a television sound signal from one or more broadcasting stations and a home television apparatus, a tuner, having a local oscillator, connected to the input terminal, an intercarrier sound demodulating circuit connected to the tuner, a split-carrier sound demodulating circuit, including a limiter amplifier, connected to the tuner, a sound signal output terminal, and switching circuitry for selectively and operatively connecting the intercarrier or split-carrier sound demodulating circuit between the tuner and sound signal output terminal. Additionally the receiver includes an error detector connected to the split-carrier sound demodulating circuit for detecting the frequency error of the tuner local oscillator and a first operational circuit responsive to the output signal from the error detector which produces a first operational output signal whereby the output signal therefrom activates the switching circuitry such that the split-carrier sound demodulating circuit is operatively connected between the tuner and the sound signal output terminal when the output signal from the error detector is less than a predetermined level. Control circuitry is provided which supplies a signal to activate the switching circuitry such that the intercarrier sound demodulating circuit is operatively connected between the tuner and sound signal output terminal whenever the home television apparatus is operatively connected to the input terminal. A second operational circuit is also provided which is responsive to output signals from a pair of level detectors which are connected to the limiter amplifier. An output signal supplied from the second operational circuit activates the switching circuitry such that the intercarrier sound demodulating circuit is operatively connected between the tuner and the sound signal output terminal when the output signals from the level detectors are below a predetermined value.

13 Claims, 11 Drawing Figures

TELEVISION SOUND RECEIVER

BACKGROUND OF THE INVENTION

1. Field of the Invention

This invention relates to a television sound receiver and more particularly to a television sound receiver which improves the tone quality of the television sound signal.

2. Description of the Prior Art

As television multiplexed sound broadcasting becomes more widely used, the tone quality of the television sound signal, which has been more or less overlooked uptil now, becomes more worthy of notice.

Generally, in receiving and demodulating television signals, intercarrier and split-carrier sound demodulating systems are typically employed. These systems will be described hereinafter.

FIG. 1 is a system diagram showing an intercarrier sound demodulating system in which a signal received at an antenna 1 is supplied to a tuner 2 from which an intermediate frequency (IF) signal containing a video carrier component with a frequency $f_p$ of, for example, 58.75 megahertz (MHz) and a sound carrier component with a frequency of $f_s$ of, for example, 54.25 MHz are produced. This IF signal is supplied to a video intermediate frequency amplifier 3 as well as to a filter 4 which is provided to extract only the video and sound carrier components. An output signal from filter 4 is supplied through an amplifier 5 to a sound detector 6. Sound detector 6 produces a frequency modulated (FM) sound signal as a beat frequency signal of 4.5 MHz and is equivalent to the difference between the video and sound carrier frequencies an output signal of sound detector 6 is applied to a frequency discriminator 7, frequency demodulated therein, and an output therefrom is supplied to a multiplexed sound signal decoder 8. Decoder 8 produces normal monaural sound signals as output signals $S_A$ and $S_B$ when the transmitted television sound is not multiplexed and a left-channel sound signal (one language sound signal) as one output signal $S_A$ and a right-channel sound signal (another language sound signal) as output signal $S_B$ when the transmitted television sound is multiplexed such as in stereo sound. One part of the signal derived from sound detector 6 is fed back to amplifier 5 so as to provide an automatic gain control (AGC) thereto.

FIG. 2 is a system diagram showing an outline of the split-carrier sound demodulating system wherein an output signal of tuner 2 is supplied to a surface acoustic wave filter 9 having a band pass characteristic such that only the sound carrier component with frequency $f_s = 54.25$ MHz is produced. This sound carrier component is applied through an amplifier 10 to a mixer 11. Additionally, a local oscillator 12 is provided which supplies an oscillating signal of 64.95 MHz to mixer 11 and thereby permits the oscillating and sound carrier signals to be multiplexed with each other. Accordingly, mixer 11 produces an output signal equal to a frequency difference between the sound carrier component and the oscillating signal of 10.7 MHz signal. The mixer output signal is supplied via a ceramic filter 13 to and demodulated at a frequency discriminator 14 which produces an output signal that is supplied to multiplexed sound signal decoder 8 and thereby produces the same output signals $S_A$ and $S_B$ as shown in FIG. 1.

The output signal of frequency discriminator 14 is supplied to local oscillator 12, forming an automatic frequency control (AFC) loop to control the local oscillating frequency of local oscillator 12.

Since the aforementioned intercarrier sound demodulating system utilizes a frequency component of 4.5 MHz which is the difference between the video and sound carrier components, the intercarrier sound demodulating system has an inherent drawback in that the video carrier component is apt to be mixed with the sound channel resulting in interference such as buzz noise.

In monaural sound broadcasting when the transmitted sound signal is not multiplexed a high band component of the sound signal is deemphasized by a deemphasis circuit of a sound FM signal wave detector resulting in a somewhat acceptable level of buzz noise. In contrast thereto, when the sound signal is multiplexed as in the present invention, the tone quality of the television sound is significantly and undesirably influenced by the buzz noise interference since it is necessary to extract a sub-channel sound signal before the entire sound signal is deemphasized.

During operation of the split-carrier sound demodulating system, the sound and video carrier components are separated from each. Thus the sound carrier component is never influenced by the video signal component and hence the sound signal reproduced by the receiver has a good tone quality.

There are, however, drawbacks in using a split-carrier sound demodulating system. For example, since the sound and video carriers are adapted to be processed independently of each other in the split-carrier sound demodulating system, when the local oscillating frequency is deviated and if the AFC is unlocked, due to, for example, changing the tuning frequency of tuner 2, the television sound signal can be lost even though the picture is still being reproduced on the screen of the receiver. Of course, the loss of a sound signal may not be readily noticed by viewers in general if the television receiver comprises only a video monitor having no sound reproducing apparatus or the demodulating decoder of the multiplexed sound signal is physically separated and located far from the television screen. But, when both the television receiver and demodulating decoder are integrally constructed and if only the picture and not the sound signal is reproduced, a viewer may not understand what has happened and may become puzzled and confused over the loss of the sound signal.

In contrast thereto, with respect to the intercarrier sound demodulating system, since the frequency difference between the video and sound carriers is utilized, the picture and sound signals of the television receiver will always be synchronized with each other such that the sound signal can never be lost while the picture signal is reproduced.

Additionally, although in receiving a very high frequency (VHF) signal no buzz or buzz beat noise occurs in the split-carrier sound demodulating system such that the tone quality of a reproduced sound signal is satisfactory, when receiving an ultra high frequency (UHF) signal, the sound signal tone quality can become unacceptable. In fact, when receiving UHF signals the split-carrier sound demodulating system can produce an inferior tone quality to that of the intercarrier sound demodulating system.

For example, in Japan, the local oscillating frequency in the tuner is 58.75 MHz higher than a received signal frequency. If a received signal i.e., an input signal, has a low level, the toner local oscillator can stably or positively oscillate at a predetermined local oscillating frequency. If the input signal level becomes high, however, a disturbing wave is superimposed upon a frequency determining element such as a variable capacitor of the tuner local oscillator which results in the local oscillating frequency being forcibly shifted. That is, due to the influence of the high level of the video carrier, a so-called "pull-in" operation of the tuner local oscillator occurs. It should be noted that the AGC is applied to the tuner in order to secure an acceptable S/N (Sound to Noise) ratio of the picture for both VHF and UHF input signals whenever the input signal level is 65 dB$\mu$ or more.

Thus when an input signal is at or above 65 dBu, the AGC will suppress and thereby significantly minimize the aforementioned pull-in operation of the tuner local oscillator. However, when the input signal is below 65 dBu, the AGC is inoperative. Thus for input signal levels just below 65 dBu, the pull-in operation an occur without being suppressed by the AGC. In such instances, if the input signal is at an ultra high rather than a very high frequency, the frequency determining element, such as the variable capacitor, will be more sensitive to the high level of the input signal resulting in much greater frequency fluctuation of the oscillator output signal and creating appreciable buzz noise interference. For example, the sensitivity of a variable capacitor at an ultra high as compared to a very high frequency can be raised by a factor of four. Therefore, in case of the UHF, if the pull-in operation, as set forth above, occurs at an input signal level of about 50 to 60 dB$\mu$ which cannot be suppressed by the AGC, the local oscillating frequency change in accordance with the input signal level. In a television receiver, since the video carrier is amplitude modulated (AM), the tuner local oscillating frequency fluctuates in response to the level of the video carrier. Thus in the split-carrier sound demodulating system, when fluctuations in the tuner local oscillating frequency occur, due to fluctuations in the UHF video carrier, the sound carrier signal fluctuates and causes buzz noise.

The degree of tone quality deterioration due to buzz noise, rapidly worsens when the AGC is not effective in the case of a UHF signal. After the buzz noise is detected and if the input signal level is further raised by about 5 dB, the tone quality deterioration becomes even more severe as compared with the tone quality of the intercarrier sound demodulating system.

To prevent such deterioration the AGC of the UHF tuner must be arranged such that the AGC becomes effective when the input signal level is still 50 to 60 dB$\mu$. However, by lowering the threshold level which activates the AGC, the S/N ratio of the picture will deteriorate, as set forth above, and becomes unsuitable for practice. To prevent such S/N deterioration, a buffer amplifier inserted between the local oscillator of the UHF tuner and the mixer has been considered. However, it is quite difficult to design a buffer amplifier which is capable of covering the entire UHF range. Furthermore, even if such a design were possible, it would be quite difficult to produce such an amplifier at an attractive manufacturing cost.

An additional problem arises in the split-carrier sound demodulating system due to amplitude to phase modulation (AM-PM) conversion prior to transmission of a signal. More specifically, since the video carrier as well as the sound carrier are influenced and fluctuated for phase at the same time by the same amount in a satellite multiple relaying broadcasting system, in the intercarrier sound demodulating system, the phase fluctuated amount is cancelled whereby no buzz noise occurs. But, in the split-carrier sound demodulating system, since the sound carrier component modulated for phase is separated from the video carrier component and reproduced as it is demodulated, the phase modulated component is not eliminated so that buzz noise occurs.

Thus, as described above, neither the nor the intercarrier sound demodulating system is always suitable in improving the tone quality of the television sound signal and each system has various defects.

In order to take advantage of the best aspects from both systems, a television receiver, as shown in FIG. 3, and which includes a multiplexed sound signal decoder can be used.

In FIG. 3, a television sound receiver is provided which includes both intercarrier and split-carrier sound demodulating circuits and is designed to select one of the demodulated output signals produced from either circuit.

The intercarrier sound demodulating circuit is supplied within output signal derived from tuner 2 which is applied to video intermediate frequency amplifier 3. An output signal from video intermediate frequency amplifier 3 is delivered to a video detector circuit (not shown) as well as sound detector circuit 6. The frequency modulated sound signal derived from sound detector circuit 6 is supplied to and frequency-demodulated by frequency discriminator 7, which provides an output signal that is delivered to a signal switching circuit 16.

The split-carrier sound demodulating circuit is also supplied with the output signal derived from tuner 2 which is applied to surface acoustic wave filter 9. An output signal from filter 9 which contains the sound carrier component only, is applied and converted to a sound carrier signal having a frequency of 10.7 MHz by a frequency converter or converting circuit 15. An output signal from frequency converter 15 is supplied to and demodulated at a frequency discriminator or discriminating circuit 14. The demodulated output signal therefrom is supplied to signal switching circuit 16 which selectively switches from the demodulated output signal supplied by frequency discriminator 7 to the demodulated output signal supplied by frequency discriminator 14 such that the output signal from frequency discriminator 14 is delivered to multiplexed sound signal decoder 8.

A control circuit for switchably controlling signal switching circuit 16 includes a low pass filter 17 and compartor 18. The output signal from frequency discriminator 14 is supplied to low pass filter 17 which produces an S-shaped output (refer to FIG. 4) and which is delivered to comparator or comparing circuit 18.

When the receiving condition is not acceptable and the frequency of the local oscillator (not shown), which is included in tuner 2, is altered by, for example, ±250 kHz or more due to, for example, fine tuning of tuner 2, comparator 18 produces, for example, a detecting high level output signal "1". The detected output signal "1" is supplied to signal switching circuit 16 as the control signal through an OR circuit 19, so that signal switching circuit 16 is switched to supply the demodulated output signal delivered from frequency discriminator 7 in the intercarrier sound demodulating circuit to multiplexed sound signal decoder 8.

When the receiving condition is satisfactory, however, comparator 18 does not produce the detecting output "1", so that signal switching circuit 16 is switched to supply the demodulated output signal derived from frequency discriminator 14 of the split-carrier sound demodulating circuit which is delivered to multiplexed sound signal decoder 8.

Accordingly, since comparator 18 does not produce the detecting output "1" under normally satisfactory receiving conditions, the signal provided output demodulated by the split-carrier sound demodulating circuit is supplied to multiplexed sound signal decoder 8 and thereby reproduces a television sound signal with good tone quality and no buzz noise interference.

If the frequency error of the local oscillator included in tuner 2 reaches or becomes greater than a predetermined value and when fine tuning or other tuning is performed at tuner 2, such that the AGC is unlocked, comparator 18 produces the detecting output "1" resulting in the output signal produced by the intercarrier sound demodulating circuit being delivered to multiplexed sound signal decoder 8. Thus the receiver, as shown in FIG. 3, will never allow the sound signal to be lost while the picture is reproduced on the picture screen.

Furthermore an additional change-over switch (not shown) can be included in the receiver to force signal switching circuit 16 to switch from the split-carrier sound demodulating circuit to the intercarrier sound demodulating circuit. For example, when a UHF signal is received by antenna 1 and when the buzz noise is remarkable in the reproduced or outputted sound, a forced intercarrier switching control signal having the same high level as the detecting output "1" derived from the comparator 18 is supplied through a terminal 20 to signal switching circuit 16 via OR circuit 19 and thereby forces the receiver to switch from the split-carrier sound demodulating circuit to the intercarrier sound demodulating circuit. Therefore, the previously mentioned drawbacks caused by employing only the split-carrier sound demodulating circuit ae avoided.

However, the television sound receiver shown in FIG. 3 has the following inherent problem: Due to the characteristic of frequency discriminator 14, an output voltage E produced from low pass filter 17 provides an S-shaped characteristic as illustrated in FIG. 4. That is, the output voltage E of low pass filter 17 varies in accordance with the change of an input signal frequency f applied to filter 17. More specifically, as shown in FIG. 4, character $f_0$ represents a tuning frequency of frequency discriminator 14 wherein when $f=f_0$, $E=0$. When $f_1 \leq f = f_2$, E and f form a linear relationship and when $f < f_1$ and $f > f_2$, $E=0$. Output voltage E is equal to $E_1$ and $E_2$ when f is equal to $f_1$ and $f_2$ respectively. Also, $f_1'$ and $f_2'$ are respectively selected such that $f_1 < f_1' < f_0$, $f_0 < f_2' < f_2$ and $f_2' - f_0 = F_0 - f_1'$. The corresponding values of E when $f=f_1'$ and $f=f_2'$ are $E=E_1'$ and $E=E_2'$, respectively. Furthermore, when the local oscillator included within tuner 2 as set forth above, is deviated by ±250 kHz or more, tuning frequency f is equal to $f_2'$ and $f_1'$, respectively.

In comparator 18, voltages $E_1'$ and $E_2'$ are predetermined reference voltages such that when E satisfies the conditions $E_1' \leq E = E_2'$, in other words, when f is within a range of $f_1' \leq f \leq f_2'$, shown by reference letter a in FIG. 4, the detecting signal becomes "0" as mentioned above. Thus signal switching circuit 16 is switched to supply the demodulated output signal derived from the split-carrier sound demodulating circuit to multiplexed sound decoder 8.

Additionally, when E is less than $E_1'$ or greater than $E_2'$, that is, when and $E > E_2'$, tuning frequency f is less than $f_1'$ or greater than $f_2'$, that is, $f < f_1'$ or $f > f_2'$, respectively, as shown by letter b in FIG. 4. In particular, for those values of frequency f where $f_1 \leq f < f_1'$ or $f_2' < f \leq f_2$ the detecting signal becomes "1" as described above. Thus, signal switching circuit 16 is switched to supply the demodulated output signal from the intercarrier sound demodulating circuit to multiplexed sound signal decoder 8.

However, when large deviations occur in the local oscillating frequency of the local oscillator included within tuner 2, tuning frequency f contained in the input signal applied to frequency discriminator 14 becomes greater than $f_2$ or less than $f_1$ and E becomes equal to zero ("0") rather than equaling the high level output signal "1". Thus signal switchng circuit 16 misoperates and supplies the demodulated output signal from the split-carrier rather than the intercarrier sound demodulating circuit to multiplexed sounder decoder 8.

Another problem which arises in FIG. 3, and which the present invention specifically addresses, occurs when the television sound receiver a video tape recorder (VTR) which monitors both audio and video transmitted signals or a community antenna television (CATV) adapter, which receives a CATV broadcasting wave, is connected to tuner 2. Typically, a radio frequency (RF) television signal occupying a vacant broadcasting channel is derived from the VTR or CATV adapter and is supplied to an RF input terminal such as an antenna terminal of the television receiver.

However, the frequency of the RF television signal which occupies the vacant broadcasting channel is generally unstable. Thus when the split-carrier sound demodulating circuit is selected by the television sound receiver, for demodulating an FM RF television signal supplied from the vacant broadcasting channel the residual frequency fluctuation component is noise and results in the deterioration of the S/N of a reproduced sound signal.

OBJECTS AND SUMMARY OF THE INVENTION

Accordingly, it is an object of the present invention to provide a television sound receiver which avoids the foregoing disadvantages of the prior art.

More specifically, it is an object of the present invention to provide a television sound receiver which improves the tone quality of the reproduced television sound signal.

It is another object of the present invention to provide a television sound receiver which demodulates an RF television signal using an intercarrier sound demodulating circuit whenever the RF television sound signal is supplied to the receiver from a VTR or CATV adapter.

According to an aspect of the present invention, a television sound receiver comprises:

input terminal means for receiving a modulated television sound signal having a frequency associated therewith and which is selected from at least one broadcasting stations and a home television apparatus;

tuning means for tuning the receiver to the frequency of said modulated television having a local oscillator and connected to said sound signal and providing a tuned output signal, said tuning means including an oscillating means for producing an oscillating signal at an oscillating frequency;

intercarrier sound demodulating means for demodulating said tuned output signal and providing an intercarrier sound demodulated output signal;

split-carrier sound demodulating means for demodulating said tuned output signal, which includes a limiter amplifier having at least one output signal, and which provides a split-carrier sound demodulated output signal;

sound signal output terminal means; switching means operable to select from said intercarrier and split-carrier sound demodulated output signals and to supply said selected signal to said sound signal output terminal means;

error detecting means for detecting frequency error in said oscillating frequency of said oscillating means and providing an error detected output signal first operational means for operating on said error detected output signal and providing a first operational output signal which has at least a high and and a low level; control means operable for providing a control output signal having at least a high level and a low level in accordance with the type of modulated television sound signal selected by said input terminal means level detecting means for detecting said at least one output signal of said limiter amplifier and providing a level detected output signal; and second operational meas for operating on said level detected output signal of said level detecting means and providing a second operational output signal whereby said signal selected by said switching means and supplied to said sound signal output terminal means is selected in accordance with the level of said output signal of said first operational means, the level of the output signal of said control means and the level of said output signal of said second operational means.

The above, and other objects, features and advantages of the present invention will be apparent from the following description which is to be read in conjunction with the accompanying drawings through in which like references designate the same elements and parts.

DESCRIPTION OF THE PREFERRED EMBODIMENTS

Figure 1:
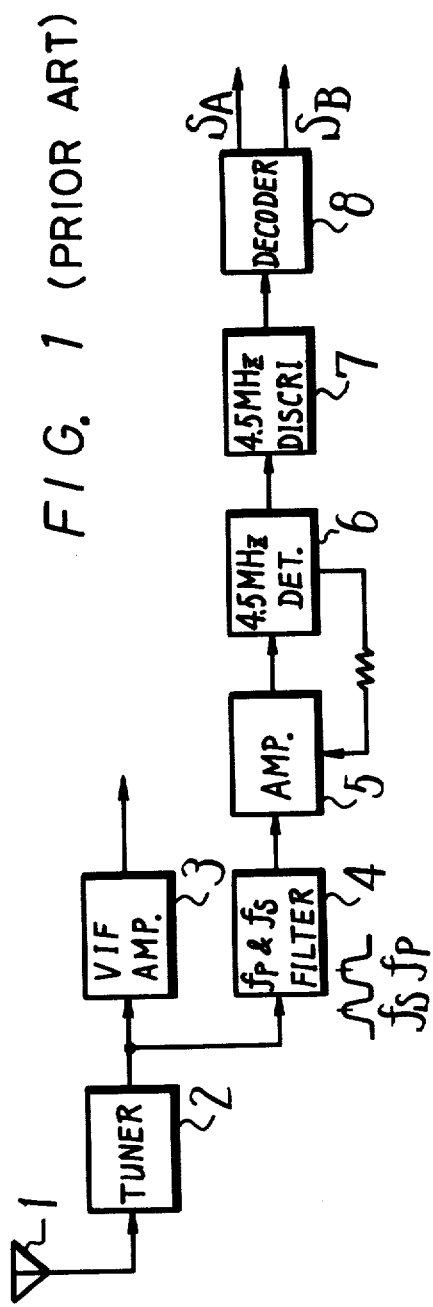
FIG. 1 is a block diagram of a conventional television sound receiver which includes an intercarrier sound demodulating system.
Figure 2:
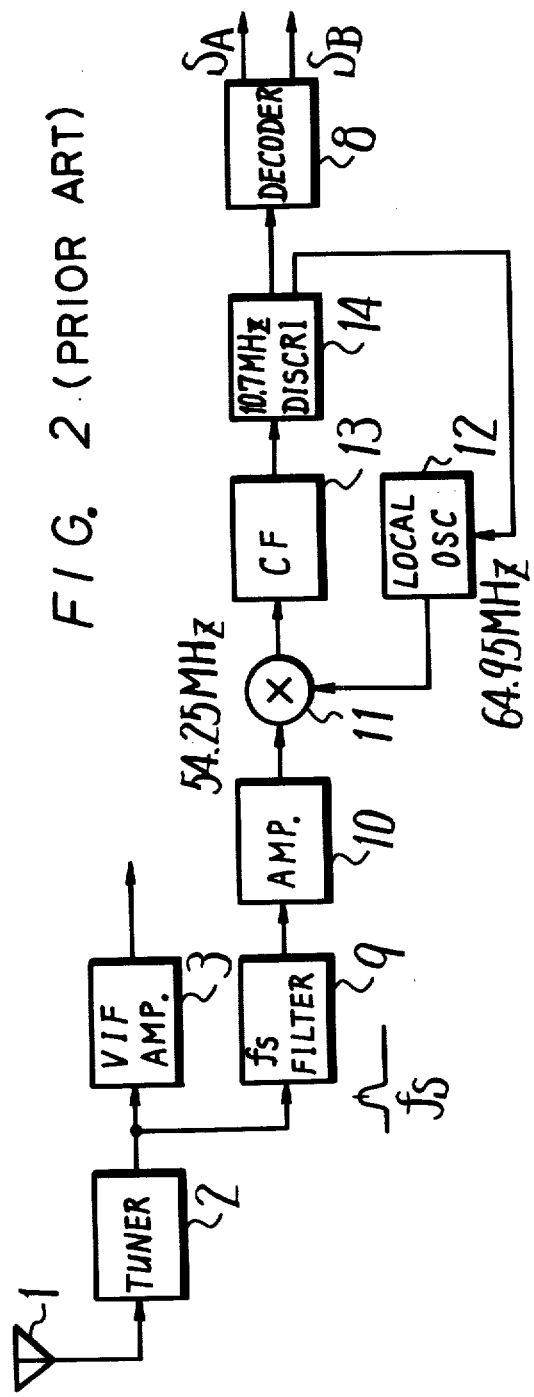
FIG. 2 is a block diagram of a conventional television sound receiver which includes a split-carrier sound demodulating system.
Figure 3:
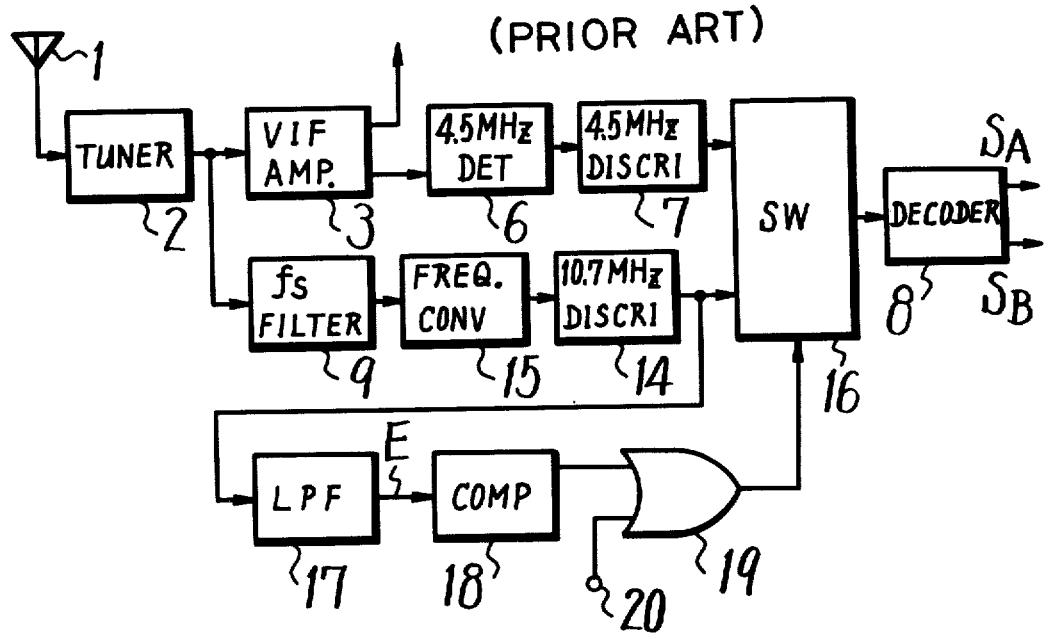
FIG. 3 is a block diagram of a conventional television sound receiver which includes both intercarrier and split-carrier sound demodulating system.
Figure 4:
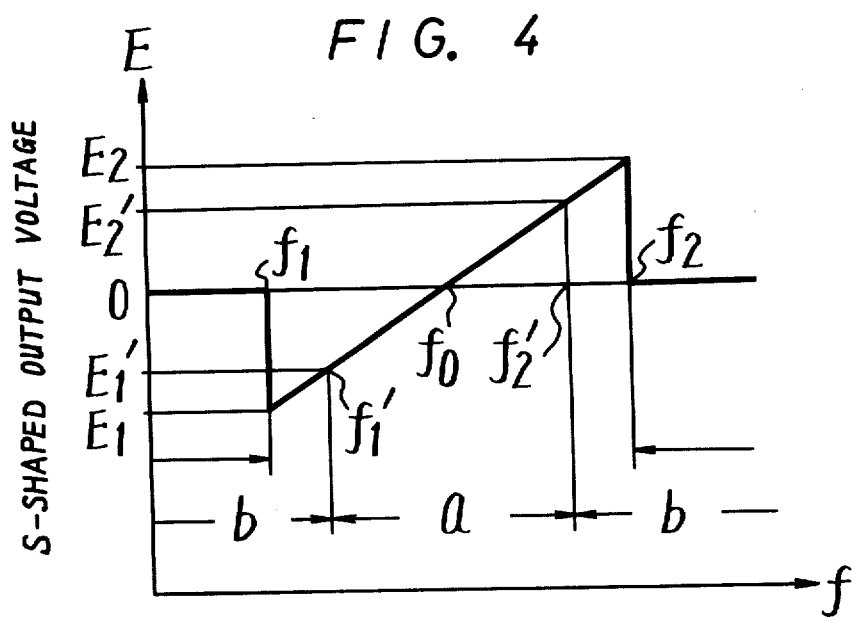
FIG. 4 is a graph of a frequency characteristic curve illustrating the operation of a low pass filter as shown in FIG. 3.
Figure 5:
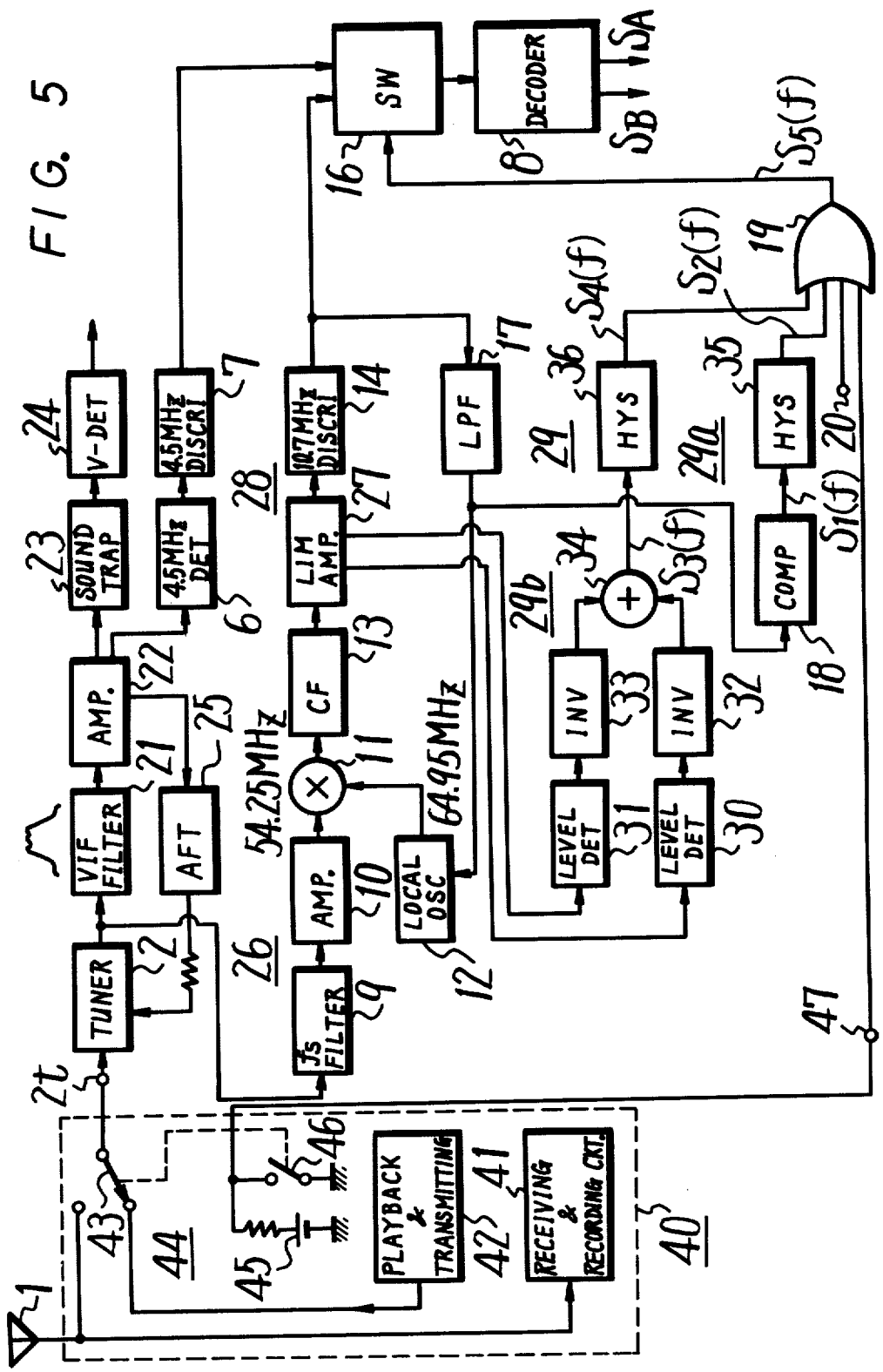
FIG. 5 is a schematic block diagram of a television sound receiver in accordance with an embodiment of the present invention.

In FIG. 5, elements and parts corresponding to thosse of FIGS. 1 to 3 are marked with the same references. Accordingly, further description thereof will be omitted.

The illustrative embodiment of the present invention, shown in FIG. 5, includes a VTR as a home television apparatus which is connected to a television receiver.

Reference 2t designates an RF input terminal (antenna terminal) connected to tuner 2 and 40 denotes a typically VTR which includes a receiving and recording circuit 41. Receiving and recording circuit 41 includes a receiving circuit (comprising a tuner) which receives the RF television signal from antenna 1 and a recording circuit which modulates the respective video and audio signals and supplies the same to rotary and fixed magnetic heads (not shown).

VTR 40 further includes a playback and transmitting circuit 42 comprising a playback circuit, which is supplied with reproduced signals from the rotary and fixed magnetic heads, and a transmitting or converting circuit which converts transmits the video and audio signals from the playback circuit to an RF television signal on a vacant channel (for example channel 2 in Tokyo, Japan) in the VHF band.

Additionally, VTR 40 inludes a switching means, that is, a change-over switch 43 which can selectively connect to antenna 1 or playback and transmitting circuit 42 and is connected to RF input terminal 2t. Switch 43 is a manual switch or an electronic switch which is the latter case can be switched by another manual switch or remote control. The output signal from tuner 2 is supplied through a surface acoustic wave filter 21, having a video intermediate frequency selecting characteristic, to an amplifier 22, the output of which is supplied through a sound trap circuit 23 to a video detector or detecting circuit 24 which produces a video detected output. Additionally, the signal derived from amplifier 22 is delivered to an automatic fine tuning (AFT) circuit 25 to control the frequency of the tuner output signal. More specifically, when a frequency error in the video intermediate frequency (IF) carrier is detected, the AFT provides a signal to the local oscillating frequency of the tuner 2 to correct for the frequency error.

Numeral 26 designates the split-carrier sound demodulating circuit wherein the output signal produced from tuner 2 is supplied to surface acoustic wave filter 9 from which a sound carrier component with the frequency of 54.25 MHz is supplied through amplifier 10 to a mixer or mixing circuit 11.

A local oscillator or oscillating circuit 12 provides a local oscillating signal with a frequency of 64.95 MHz which is delivered to mixer 11. The output signal from mixer 11 includes components having frequencies equal to the difference between and sum of the input signals applied thereto. Ceramic filter 13, which is supplied with the output signal of mixer 11 has a band pass characteristic such that a sound carrier component equal to the frequency difference between the input signals of mixer 11, that is, having a frequency of 10.7 MHz is provided as an output signal therefrom. The output signal of ceramic filter 13 is supplied through a limiter amplifier 27, having three stages, to and frequency-demodulated at frequency discriminator 14 whose demodulated output is delivered to switching circuit 16. Also, the output derived from frequency discriminator 14 is applied to local oscillator 12 by way of low pass filter 17, so that the oscillating frequency thereof is controlled and thereby allows for AFC to be performed thereon.

Numeral 28 denotes a typical intercarrier sound demodulating circuit in which the output signal derived from amplifier 22 is supplied to sound signal detector 6 and from which a sound carrier component having a frequency of 4.5 MHz is derived and then delivered to and demodulated at frequency discriminator 7. The demodulated output therefrom is supplied to switching circuit 16 which serves as the selecting means.

A first control circuit 29a, which corresponds to the control circuit previously described with reference to FIG. 3 is part of a control circuit 29 that controls the switching circuit 16. The demodulated output signal generated from frequency discriminator 14 is supplied to the low pass filter 17. The S-shaped output signal (refer to FIG. 6A) produced therefrom is delivered to comparator 18. The detected output signal from comparator 18 is supplied as the switching control signal to switching circuit 16 through a first hysteresis circuit 35 and OR circuit 19. As disclosed previously, with reference to FIG. 3, OR circuit 19 includes terminal 20 which allows the receiver to be forcibly switched from a split-carrier to intercarrier sound demodulating mode of operation.

In a second control circuit 29b, which is also part of control circuit 29, the sound carrier components having the frequency of 10.7 MHz derived from, for example, second and third stages of limiter amplifier 27 are respectively applied to level detectors or detecting circuits 30 and 31. The respective detecting outputs, which are DC voltages, are supplied through inverters, that is, 32 and 33 to and added together at a synthesizer or adder 34. The added output (refer to FIG. 6C) therefrom is supplied to switching circuit 16 as another switching control signal via a second hysteresis circuit 36 and OR circuit 19.

Figure 6:
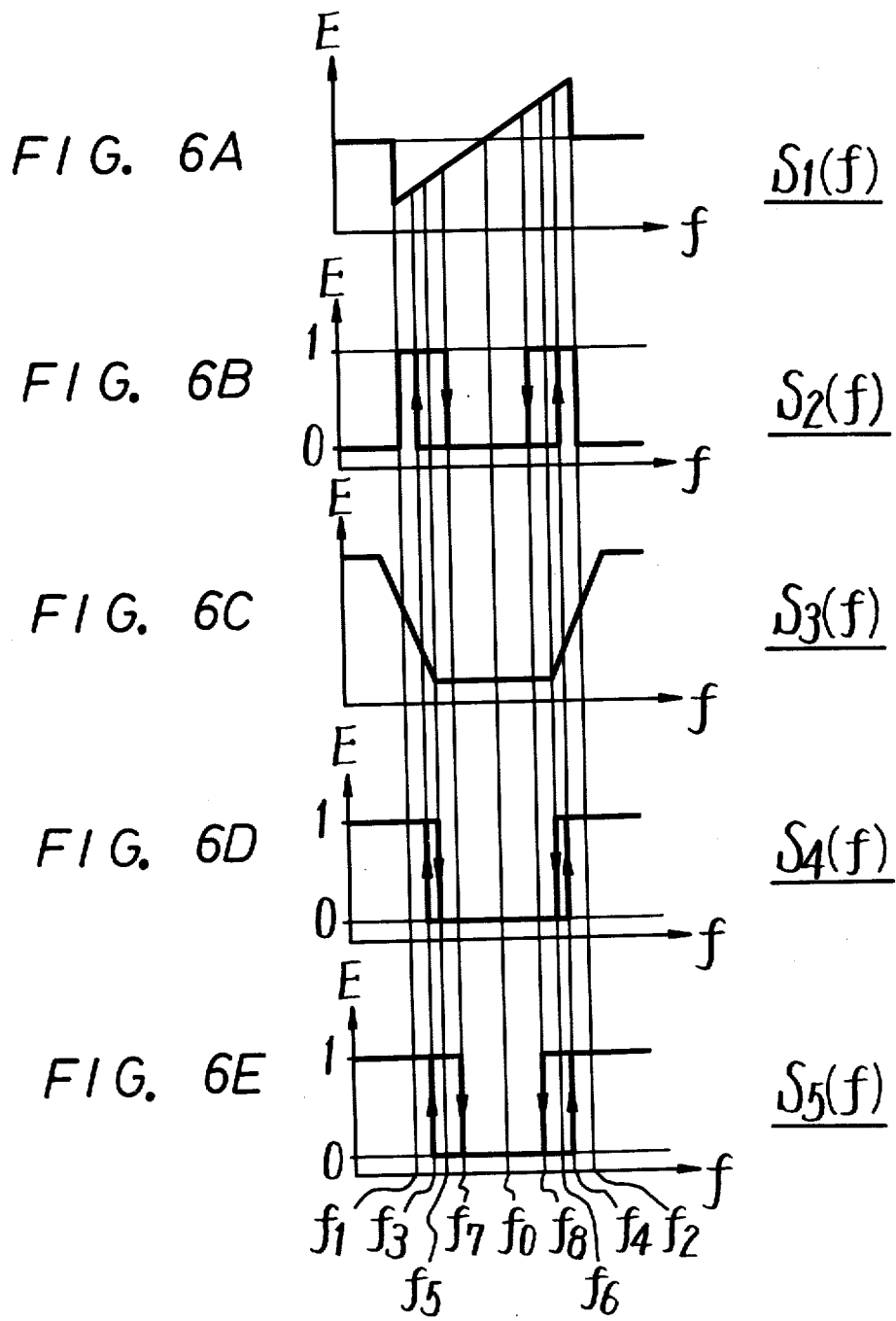
FIGS. 6A to 6E are graphs of frequency characteristic curves illustrating the operation of FIG. 5.

FIGS. 6A to 6E illustrate graphically the operation of control circuit 29. More specifically, FIG. 6A is a graph of the frequency characteristic curve of an S-shaped output voltage $S_1(f)$ to be supplied to comparator 18, FIG. 6B shows a graph which illustrates the frequency characteristic curve of an output voltage $S_2(f)$ derived from first hysteresis circuit 35, and FIG. 6C is a graph which shows the frequency characteristic curve of a level detecting voltage $S_3(f)$ supplied to the second hysteresis circuit 36. Voltage $S_4(f)$, as shown in FIG. 6D, illustrates a frequency characteristic curve of the output voltage derived from second hysteresis circuit 36. FIG. 6E shows a graph which is the frequency characteristic curve of a switching control signal $S_5(f)$ $\{=S_2(f)+S_4(f)\}$ which is delivered to switching circuit 16.

As illustrated in FIGS. 6A to 6E, letter $f_0$ denotes a center frequency of the tuning circuit in frequency discriminator 14. Letters $f_1$ to $f_8$ each denote frequencies wherein $f_1<f_3<f_5<f_7<f_0<f_8<f_6<f_4<f_2$. Also, frequencies $f_1$, $f_2$; $f_3$, $f_4$; $f_5$, $f_6$ and $f_7$, $f_8$ are respectively symmetrical with respect to center frequency $f_0$.

The input voltage to be applied to comparator 18, namely, the S-shaped output voltage $S_1(f)$ (FIG. 6A) becomes "0" whenever $f<f_1$, $f>f_2$ and $f=f_0$. When $f_1<f<f_2$, voltage $S_1(f)$ linearly increases in accordance with the increase of f.

In accordance with the increase of f, output voltage $S_2(f)$ (FIG. 6B) from first hysteresis circuit 35 is "0" when $f<f_1$, "1" when $f_1\leq f<f_7$, "0" when $f_7\leq f<f_4$, "1" when $f_4\leq f<f_2$ and "0" when $f_2\leq f$.

Also, in accordance with the decrease of f, output voltage $S_2(f)$ (FIG. 6B) from first hysteresis circuit 35 is "0" when $f_2<f$, "1" when $f_8<f\leq f_2$, "0" when $f_3<f\leq f_8$, "1" when $f_1<f\leq f_3$ and "0" when $f\leq f_1$.

Input voltage $S_3(f)$ (FIG. 6C) to be applied to second hysteresis circuit 36 has a minimum level (constant value) when $f_5\leq f\leq f_6$ and the level thereof is gradually increased when f is decreased from $f_5$ or increased from $f_6$. That is, $S_3(f)$ has a characteristic curve which resembles the inversion of the band pass characteristic of ceramic filter 13.

Output voltages $S_4(f)$ (FIG. 6D) derived from second hysteresis circuit 36 becomes "1" when $f<f_5$, "0" when $f_5\leq f<f_4$ and "1" when $f_4\leq f$, respectively, in accordance with the increase of f.

Also, in accordance with the descrease of f, output voltage $S_4(f)$ (FIG. 6D) derived from second hysteresis circuit 36 becomes "1" when $f_6<f$, "0" when $f_3<f\leq f_6$ and "1" when $f\leq f_3$.

Accordingly, in response to the increase of f, the switching control signal $S_5(f)$ $\{=S_2(f)+S_4(f)\}$ (FIG. 6E) is "1" when $f<f_7$, "0" when $f_7\leq f<f_4$ and "1" when $f_4\leq f$.

Also, in accordance with the decrease of f, switching control signal $S_5(f)$ (FIG. 6E) becomes "1" when $f_8<f$, "0" when $f_3<f\leq f_8$ and "1" when $f\leq f_3$.

As described above, when $S_5(f)=$"1", switching circuit 16 is activated such that the demodulated output signal produced by frequency discriminator 7 in the intercarrier sound demodulating circuit is delivered to multiplexed sound signal decoder 8. When $S_5(f)=$"0", switching circuit 16 is activated such that the demodulated output signal produced by frequency discriminator 14 in the split-carrier sound demodulating circuit is delivered to multiplexed sound signal decoder 8.

In VTR 40 a control means or device 44 is provided which controls switching circuit 16 such that when change-over switch 43 is switched so as to supply the RF television signal from playback and transmitting circuit 42 to RF input terminal 2t, the demodulated output signal from intercarrier sound demodulating circuit 28 is supplied to multiplexed sound signal decoder 8. More specifically, the positive electrode of a DC voltage source 45, whose negative electrode is grounded, is connected to and can be grounded through a switch 46. Switch 46 is an ON/OFF switch which is ganged with switch 43. The positive electrode of DC voltage source 45 is also connected to an intercarrier/-split-carrier change-over control terminal 47 which is connected to an input terminal of OR circuit 19. When switch 43 is connected to antenna 1, switch 46 is switched ON which grounds the positive electrode of DC voltage source 45 and results in a low level ("0") signal supplied to OR circuit 19 from change-over control terminal 47. However, when switch 43 is connected to playback and transmitting circuit 42, switch 46 is turned OFF and results in a high level output ("1") signal, supplied to OR circuit 19 from change-over control terminal 47. Accordingly, switching circuit 16 selects the demodulated output signal from intercarrier sound demodulating circuit 28 which is supplied to decoder 8.

In constructing the television receiver, it may be possible to incorporate the entire VTR 40 or portions thereof, such as switch 43 and control means or device 44, in the television receiver.

Figure 7:
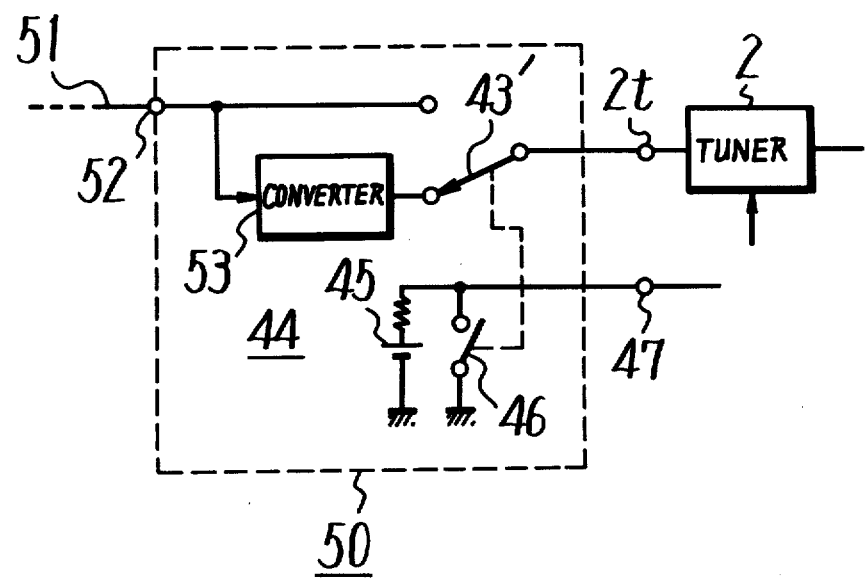
FIG. 7 is a schematic block diagram of a CATV receiving adapter which is connected to the input terminal of the television sound receiver.

Another example of a home television apparatus, that is, a CATV adapter which can be coupled to the television receiver, is shown in FIG. 7.

In FIG. 7, reference numeral 50 designates the CATV receiving adapter, 51 a transmission line (coaxial cable) for the RF CATV signal, and 52 an input terminal of CATV adapter 50 connected to transmission line 51. Transmitted through transmission line 51 are normal standard television signals for example, television signals of 1- to 12-channels in the VHF band, and non-standard television signals which are typically referred to as PAY-channels. The PAY-channel television signals are supplied to a converter 53 which descrambles and converts the PAY-channel television signal into an RF television signal which will occupy a vacant broadcasting channel. The RF television signal from converter 53 is supplied to a change-over switch 43', which switches between the standard television signal from input terminal 52 and the descrambled and converted non-standard television signal from converter 53, and is supplied therefrom to RF input terminal 2t of the television receiver.

Included in CATV adapter 50 is control device or means 44' similar to control device 44 of FIG. 5, and which has a switch 46' that is ganged with switch 43'.

When switch 43' is switched so as to be connected to converter 53, switch 46' is switched to an electrically nonconductive state and thereby permits a high level ("1") signal, provided by a DC voltage source 45', to be supplied through intercarrier/split-carrier change-over control terminal 47 to OR circuit 19 (not shown). Thus, the switching circuit 16 receives the demodulated output signal from intercarrier sound demodulating circuit 28 which is then supplied to multiplexed sound signal decoder 8.

In constructing the television receiver, and as similarly and previously noted with respect to VTR 40, it may be possible to incorporate the entire CATV adapter 50 or portions thereof, such as switch 43' and control means 44' in the television receiver. Furthermore, it may be possible to use different tuners 2 for the standard television signals and PAY-channel television signals.

In accordance with the present invention as described above, under normal satisfactory receiving conditions, the demodulated output signal provided by split-carrier sound demodulating circuit 26 is supplied to multiplexed sound signal decoder 8 and reproduces a good television sound signal having no buzz noise.

Furthermore, when the frequency stability of the inputted RF television signal is low, the demodulated output signal from the intercarrier sound demodulating circuit is selected so that the S/N ratio of the reproduced sound does not deteriorate.

Thus the present invention provides the following advantages:

If the local oscillating frequency is deviated by more than a predetermined value by, for example the fine tuning tuner 2, the demodulated output signal provided by intercarrier sound demodulating circuit 28 is supplied to multiplexed sound signal decoder 8, so that the sound signal is not lost while the picture signal is reproduced on the picture screen.

Additionally, the present invention avoids misoperation of the television receiver by preventing the split-carrier sound demodulating circuit from being selected when large deviations in the local oscillating frequency derived from tuner 2 occur.

Still further, by providing hysteresis circuits 35 and 36 ringing which can occur when selecting either of the demodulated output signals is avoided.

Still further, the present invention can include muting circuits to mute undesired audio signals. For example, switching circuit 16, can be replaced with a selecting means such that the demodulated outputs signals from the intercarrier and split-carrier sound demodulating circuits are supplied to the selecting means through amplifiers (not shown) which are respectively provided at the next stages of frequency discriminators 7 and 14 wherein the amplifiers include muting circuitry so as to make the amplifiers inoperative at undesired audio signals.

Having described specific embodiments of the invention with reference to the accompanying drawings, it is to be understood that the invention is not limited to these precise embodiments, and that many modifications and variations may be effected therein by one skilled in the art without departing from the spirit or scope of the invention which is intended to be defined by the appended claims.

We claim as our invention:

1. A television receiver comprising:
   input terminal means for receiving a modulated television sound signal having a frequency associated therewith and which is selected from at least one broadcasting station and a home television apparatus;
   tuning means for tuning the receiver to the frequency of said modulated television sound signal and providing a tuned output signal, said tuning means including first oscillating means for producing an oscillating signal at an oscillating frequency;
   intercarrier sound demodulating means for demodulating said tuned output signal and providing an intercarrier sound demodulated output signal;
   split-carrier sound demodulating means for demodulating said tuned output signal, which includes a limiter amplifier having at least one output signal, and which provides a split-carrier sound demodulated output signal;
   sound signal output terminal means;
   switching means operable to select from said intercarrier and split-carrier sound demodulated output signals and to supply said selected signal to said sound signal output terminal means;
   error detecting means for detecting frequency error in said oscillating frequency of said first oscillating means and providing an error detected output signal;
   first operational means for operating on said error detected output signal and providing a first operational output signal which has at least a high level and a low level;
   control means operable for providing a control output signal having at least a high level and a low level in accordance with the type of modulated television sound signal selected by said input terminal means;
   level detecting means for detecting said at least one output signal of said limiter amplifier and providing a level detected output signal; and
   second operational means for operating on said level detected output signal and providing a second operational output signal which has at least a high level and a low level; whereby said signal selected by said switching means and supplied to said sound signal output terminal means is selected in accordance with the level of said output signal of said first operational means, the level of said output signal of said control means and the level of said output signal of said second operational means.

2. A television receiver as in claim 1; wherein said switching means selects said intercarrier sound demodulated output signal whenever said input terminal means selects said modulated television sound signal supplied by said home television apparatus.

3. A television receiver as in claim 1; wherein said home television apparatus is a video tape recorder having a radio frequency modulator and which supplies said modulated television sound signal to said input terminal means on a vacant television broadcasting channel.

4. A television receiver as in claim 1; wherein said home television apparatus is a CATV adapter having a frequency converter for supplying said modulated television sound signal to said input terminal means on a vacant television broadcasting channel.

5. A television receiver as in claim 1; further comprising a multiplexed sound decoder having an input terminal connected to said sound signal output terminal means and a pair of audio output terminals.

6. A television receiver as in claim 1; wherein said first and second operational means include hysteresis circuits.

7. A television receiver as in claim 1; wherein said intercarrier sound demodulated output signal is selected by said switching means and supplied to said sound signal output terminal means when said oscillating frequency of said first oscillating means, as detected by said error detecting means, is outside of a predetermined range.

8. A television receiver as in claim 1; wherein said level detecting means includes a pair of level detectors having a pair of output signals, respectively, and further wherein said intercarrier sound demodulated output signal is selected and supplied to said sound signal output terminal means when said pair of output signals of said level detectors are below a predetermined amplitude.

9. A television receiver as in claim 1; wherein said intercarrier sound demodulating means includes an intercarrier sound detector and a first frequency discriminator and further wherein said split-carrier sound demodulating means further includes a first selective filter which selects a first sound carrier component included within said tuned output signal supplied from said tuning means; an amplifier which amplifies an output signal of said first selective filter, a mixer circuit which mixes, as input signals supplied thereto, signals provided by said amplifier and second oscillating means and produces an output signal which contains at least second and third sound carrier components having frequencies respectively equal to the sum of and difference between the frequencies of said input signals supplied to said mixer circuit, a second selective filter which produces said third sound carrier component as an output signal; and a second frequency discriminator.

10. A television receiver as in claim 9; wherein said error detecting means includes a low pass filter, which has an output signal and is connected to said second frequency discriminator and a comparator which is connected to said low pass filter.

11. A television receiver as in claim 10; wherein in response to said output signal of said low pass filter said second oscillating means produces one of said input signals supplied to said mixer circuit.

12. A television receiver comprising:

input terminal means for receiving a modulated television sound signal having a frequency associated therewith and being selected from at least one broadcasting station and a home television apparatus, each said broadcasting station transmitting modulated television sound signals which include standard and non-standard modulated television sound signals and said home television apparatus receiving and converting said non-standard modulated television sound signals to said standard modulated television sound signals which are supplied to said input terminal means on a vacant television broadcasting channel;

tuning means for tuning said receiver to the frequency of said modulated television sound signal and providing a tuned output signal, said tuning means including an oscillating means for producing an oscillating signal at an oscillating frequency;

intercarrier sound demodulating means for demodulating said tuned output signal and providing an intercarrier sound demodulated output signal;

split-carrier sound demodulating means for demodulating said tuned output signal and providing a split-carrier sound demodulated output signal, said split-carrier sound demodulating means including a limiter amplifier having at least one output signal;

sound signal output terminal means;

switching means operable to select from said intercarrier and split-carrier sound demodulated output signals and to supply said selected signal to said signal output terminal means;

error detecting means for detecting frequency error in said oscillating frequency of said oscillating means and providing an error detected output signal;

first operational means for operating on said error detected output signal and providing a first operational output signal which has at least a high level and a low level;

control means operable for providing a control output signal having at least a high level and a low level in accordance with the type of modulated television sound signal selected by said input terminal means;

level detecting means for detecting said at least one output signal of said limiter amplifier and providing a level detected output signal;

second operational means for operating on said level detected output signal and providing a second operational output signal which has at least a high level and a low level; whereby said signal selected by said switching means and supplied to said sound signal output terminal means is selected in accordance with the level of said first operational output signal, the level of said control output signal and the level of said second operational output signal.

13. A television receiver as in claim 12; wherein said switching means selects said intercarrier sound demodulated output signal whenever said input terminal means selects said modulated television sound signal supplied by said home television apparatus.

* * * * *